(12) United States Patent
Deshmukh et al.

(10) Patent No.: US 10,310,748 B2
(45) Date of Patent: Jun. 4, 2019

(54) DETERMINING DATA LOCALITY IN A DISTRIBUTED SYSTEM USING AGGREGATION OF LOCALITY SUMMARIES

(71) Applicant: Pivotal Software, Inc., Palo Alto, CA (US)

(72) Inventors: Harshad Deshmukh, Madison, WI (US); Adalbert Gerald Soosai Raj, Madison, WI (US); Jignesh M. Patel, Madison, WI (US)

(73) Assignee: Pivotal Software, Inc., San Francisco, CA (US)

( * ) Notice: Subject to any disclaimer, the term of this patent is extended or adjusted under 35 U.S.C. 154(b) by 258 days.

(21) Appl. No.: 15/249,138

(22) Filed: Aug. 26, 2016

(65) Prior Publication Data

US 2017/0060455 A1    Mar. 2, 2017

Related U.S. Application Data

(60) Provisional application No. 62/210,356, filed on Aug. 26, 2015.

(51) Int. Cl.
| | |
|---|---|
| *G06F 12/02* | (2006.01) |
| *G06F 3/06* | (2006.01) |
| *G06F 9/30* | (2018.01) |
| *G06F 16/242* | (2019.01) |
| *G06F 16/22* | (2019.01) |
| *G06F 16/9535* | (2019.01) |

(52) U.S. Cl.
CPC ............ *G06F 3/0619* (2013.01); *G06F 3/065* (2013.01); *G06F 3/067* (2013.01); *G06F 9/30036* (2013.01); *G06F 16/2255* (2019.01); *G06F 16/244* (2019.01); *G06F 16/9535* (2019.01)

(58) Field of Classification Search
None
See application file for complete search history.

(56) References Cited

U.S. PATENT DOCUMENTS

| | | |
|---|---|---|
| 2002/0129115 A1 | 9/2002 | Noordergraaf et al. |
| 2012/0209943 A1 | 8/2012 | Jung |
| 2013/0173853 A1* | 7/2013 | Ungureanu ........... G06F 12/124 711/103 |
| 2013/0297880 A1 | 11/2013 | Flynn |

(Continued)

FOREIGN PATENT DOCUMENTS

WO    WO2012/42792    4/2012

OTHER PUBLICATIONS

International Preliminary Report on Patentability in International Application No. PCT/US2016/049066, dated Feb. 27, 2018, 7 pages.

(Continued)

*Primary Examiner* — Charles Rones
*Assistant Examiner* — Ryan Dare
(74) *Attorney, Agent, or Firm* — Fish & Richardson P.C.

(57) ABSTRACT

This specification describes methods, systems, and computer program products for maintaining data representing where each data block of multiple data blocks are stored among multiple computing nodes. Each computing node generates a respective locality summary based on locally stored data blocks, and submits the locality summary to a controlling computing node.

33 Claims, 2 Drawing Sheets

(56) References Cited

U.S. PATENT DOCUMENTS

2014/0129790 A1 5/2014 Zhu
2016/0110120 A1* 4/2016 Pattabiraman ........ G06F 3/0616
711/156

OTHER PUBLICATIONS

International Search Report and Written Opinion in International Application No. PCT/US2016/049066, dated Dec. 28, 2016, 8 pages.
Nho, Ji Myong, International Search Report and Written Opinion issued in PCT/US2016/049066, dated Dec. 28, 2016, 10 pages.

* cited by examiner

DETERMINING DATA LOCALITY IN A DISTRIBUTED SYSTEM USING AGGREGATION OF LOCALITY SUMMARIES

CROSS-REFERENCE TO RELATED APPLICATIONS

This application claims the benefit under 35 U.S.C. § 119(e) of the filing date of U.S. Patent Application Ser. No. 62/210,356, filed Aug. 26, 2015, entitled "Determining Data Locality in a Distributed System Using Aggregation of Locality Summaries". The entire contents of the foregoing application is hereby incorporated by reference.

BACKGROUND

This specification relates to storing data objects in data management systems.

Data locality is defined as when the processing of data happens either on or near the storage location of the data. In a distributed system consisting of several thousands of nodes, data locality plays an important role in making scheduling decisions. Data processing on a given node cannot begin before the data is available on that node.

SUMMARY

This specification describes methods, systems, and computer program products for maintaining data representing where each data block of multiple data blocks are stored among multiple computing nodes. In some implementations, a method includes determining, by each computing node of the computing nodes, one or more block identifiers of data blocks stored locally by the computing node; generating, by each computing node of computing nodes, a locality summary having n positions and n corresponding values, wherein n is an integer less than the total number of data blocks, and wherein the locality summary represents which of the plurality of data blocks are stored locally by the computing node, including mapping each of the one or more block identifiers stored by the computing node to a particular position in the locality summary and setting a value at the particular position in the locality summary; and sending, by each computing node of the plurality of computing nodes to a controller computing node, the locality summary generated by the computing node.

Particular embodiments of the subject matter described in this specification can be implemented so as to realize one or more of the following advantages. Determining data locality using aggregation of locality summaries can improve storage efficiency while limiting any potential reduction in query retrieval efficiency. A system that uses the described techniques can use multiple different compression schemes for a single structured object, which can improve the storage efficiency of the system. The system can automatically determining an object location. The system can thus improve query retrieval performance.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

Like reference numbers and designations in the various drawings indicate like elements.

DETAILED DESCRIPTION

Figure 1:
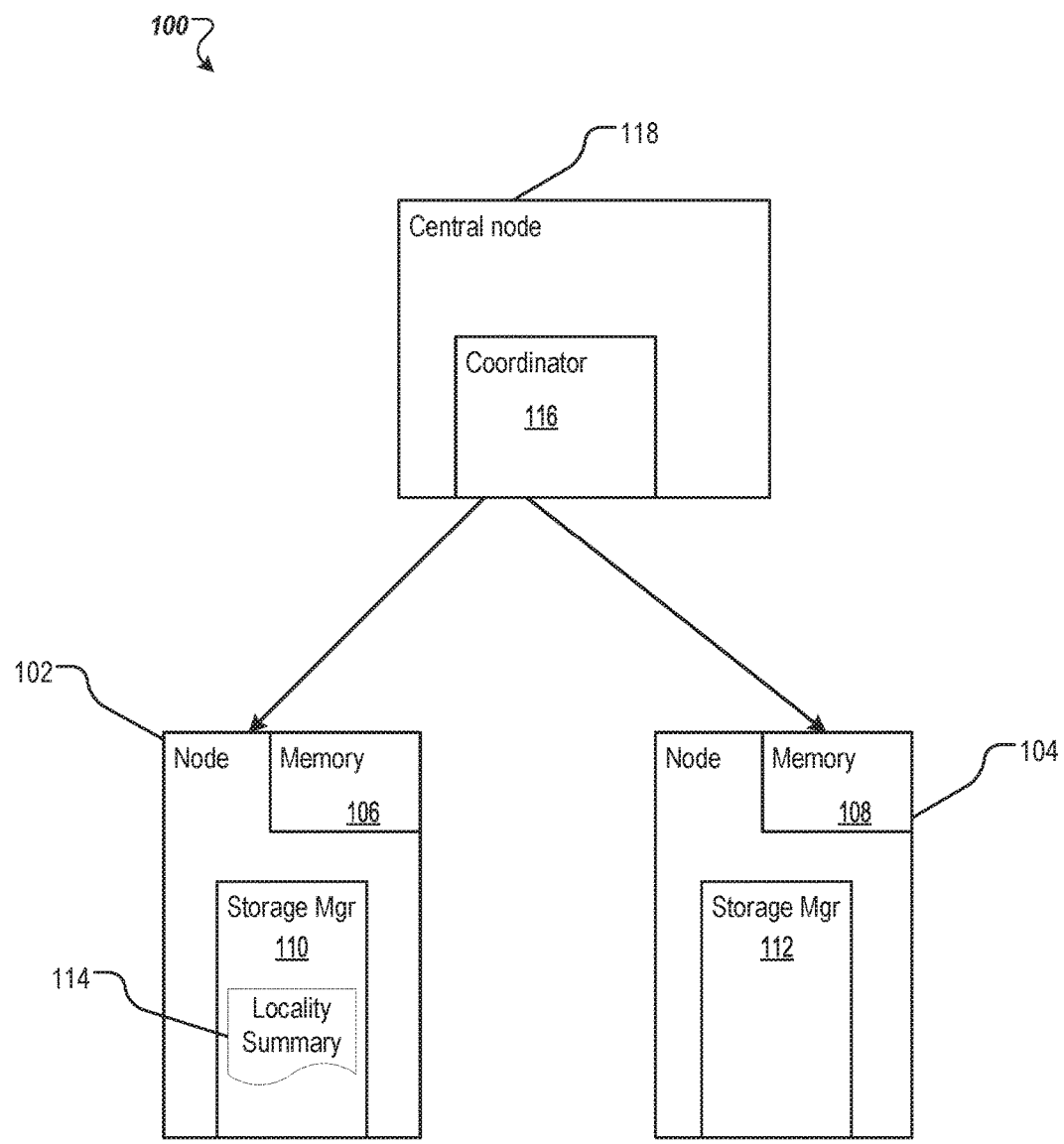
FIG. 1 is a block diagram illustrating an example distributed system implementing determining data locality using aggregation of locality summaries.

FIG. 1 is a block diagram illustrating an example distributed system 100 implementing determining data locality using aggregation of locality summaries.

This specification describes a method of determining the approximate location of a given piece of data in the distributed system 100. In this description, the piece of data will be referred to as a block; the piece of data may be, but need not be, what is conventionally referred to as a block. In a distributed system distributed suitable for the method, each block of data can be identified by a unique name (called block ID in this document) and each node, e.g., node 102 or node 104, can be identified by a unique name (called the node ID in this document). Each of nodes 102 and 104 in the distributed system 100 has some amount of main memory, e.g., main memory 106 and main memory 108, available for loading the blocks from persistent storage or for creating temporary blocks. On each node 102 or 104, a respective storage manager, e.g., storage managers 110 or 112, keeps track of the blocks that are loaded in main memory. A distributed file system is used to persist the data across all the nodes 102 and 104 in the system 100. The storage managers 110 and 112 on each node evicts one or more blocks from its main memory 106 or 108 to the distributed file system when the available main memory on that node is lower than a predefined threshold.

The storage manager on each node, e.g., the storage manager 110, maintains a locality summary, which is a data structure that stores a representation of n positions and n corresponding values, where n is a number that is less than the total number of data blocks. The locality summary 114 can be a large array of bits. Each bit in the locality summary 114 is initially set to a default value, e.g., 0. Then, setting a locality summary 114 at position i amounts to setting the i-th bit to a value that is complementary to the default value.

Given a particular input i representing a block ID, a corresponding position in the locality summary 114 can be obtained by applying an appropriate hash function to the input. For example, the hash function may be (i mod n). Thus, if the locality summary 114 is of size n, and i is greater than n, then the bit position corresponding to (i mod n) is set to the complementary value. Thus, a locality summary 114 is a compact and sparse representation of length n for a much larger bit array. In some implementations, the locality summary 114 is implemented as a Bloom filter having a single hash function. Bloom filters were originally described in Burton H. Bloom: Space/Time Trade-offs in Hash Coding with Allowable Errors, Communications of the ACM 13(7): 422-426 (1970).

Our method for using locality summaries in a distributed data processing framework to keep track of locality, i.e., of which block is stored at which node(s) in the system, is as follows:

The storage manager 110 creates a locality summary 114 at a given node 102 to determine whether a given block is loaded in the main memory 106 of that node 102. When a block is loaded into main memory 106, the ID of that block is used to set a corresponding bit in a locality summary 114 that is constructed locally at that node 102. This locality summary 114 is then an approximate map of the data that is stored in the main memory 106 of that node 102. This locality summary 114 is then periodically sent to a coordinator 116 in a central node 118, also referred to as a controlling computing node, that keeps track of the location of all the blocks that are loaded in the main memory of each node in the system 100. In using locality summaries to keep track of blocks loaded in main memory of each node, false positives are possible, but false negatives are not.

Periodically, the storage managers re-create the locality summary at each node, e.g., locality summary 114 at the node 102, by starting with an empty locality summary, then running a task, which may but need not be a background task, to go through the data in the main memory and mark each block in main memory in the locality summary. This operation is intended to ensure that the locality summary does not become out of sync with the current state of the data in main memory.

The central node 118 keeps the locality summaries from each node, and the coordinator uses this set of locality summaries to make decisions that are related to data locality, such as picking a node 102 that has a high chance of having a given data block in its main memory 106 to apply some computation on data in that block. Even if all the nodes 102 and 104 in the system 100 have access to all the data blocks, using the locality summaries to choose a node that is likely to have a particular data block reduces the cost of reading data from disk or transferring data over a network. These considerations may be combined with other factors such as balancing the load across all the nodes in the system.

To control the space and time cost of managing the locality summaries in the central node, the system 100 can optionally create a bit vector for each entry in the locality summary 114. Thus, if we are looking at the kth bit across all the locality summaries, the bit vector will contain the kth bit from each individual locality summary. The order of the positions in each bit vector is associated with a list of node ids and a separate data structure is used to keep track of that mapping.

The data structures mentioned above are optionally tagged with the timestamp of the time when they are constructed. As the central node 118, the coordinator 116 keeps collecting locality summaries from each node, many versions of the locality summaries are collected, each tagged with their creation timestamps. Given a time window and a block ID as an input, the coordinator 116 can construct a locality curve for that block. It is a 3-dimensional plot with the following dimensions:
 a. Time
 b. Node IDs
 c. A measure, which could simply be a yes/no indicator, that indicates the likelihood that the block is present or not in main memory on the given node, as determined by the locality summary of that node.

The coordinator 116 can construct the 3-dimensional curve mentioned above by using standard approximation techniques such as regression to determine parameters or a predetermined form of curve. The equation representing this constructed curved can be used to predict the location of the given block ID at a given time, or can be used to find the probability that the block will be in main memory of any node at a given time, for example.

In the example, only three nodes 102, 104 and 118 are shown. In various implementations, additional nodes and additional locality summaries can be present. A generalization of the methods described above can be used to identify the data stored at each node in storage other than main memory, e.g., local disks.

Figure 2:
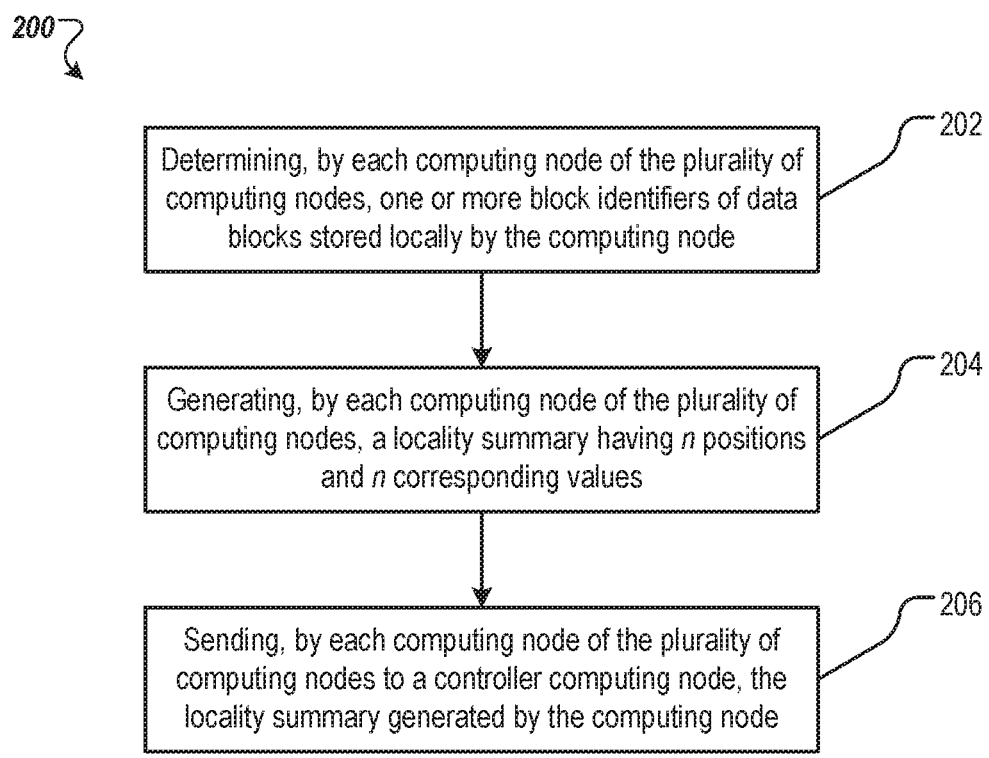
FIG. 2 is a flowchart of an example process of determining data locality in a distributed system using aggregation of locality summaries.

FIG. 2 is a flowchart of an example process 200 of determining data locality in a distributed system using aggregation of locality summaries. The process 200 can be performed by a system including one or more computers, e.g., the system 100 of FIG. 1. The system can include multiple computing nodes and a controller computing node.

Each computing node of the system determines (202) one or more block identifiers of data blocks stored locally by the respective computing node.

Each computing node of the system generates (204) a respective locality summary having n positions and n corresponding values. Here, n is an integer less than the total number of data blocks. The locality summary represents which of the plurality of data blocks are stored locally by the computing node. Generating the locality summary includes mapping each of the one or more block identifiers stored by the computing node to a particular position in the locality summary and setting a value at the particular position in the locality summary.

In some implementations, mapping each of the one or more block identifiers to a particular position in the locality summary includes computing a position index identified by (i mod n), wherein i is a block identifier, i being an integer, and n is a size of the locality summary.

Each computing node of the system sends (206), to a controller computing node, the locality summary generated by the respective computing node.

In some implementations, each computing node of the system periodically regenerating the respective locality summary for the computing node.

In some implementations, each computing node of the system receives a request to identify which computing node locally stores a particular data block identified by a particular block identifier. The system maps the particular block identifier to a particular position in the received locality summaries. A controller computing node determines which of the particular computing nodes provided a locality summary having a value set at the particular position. The controller computing node requests, from each computing node of the particular computing nodes, data indicating whether or not the computing node locally stores the particular data block.

In some implementations, the controller computing node receives an indication that a first computing node of the particular computing nodes locally stores the particular data block. The controller computing node provides, to the first computing node, a request to perform a computation using the particular data block.

In some implementations, the controller computing node maintains a respective bit vector for each position in the locality summaries received from the computing nodes. Each position in the bit vector represents whether a particular computing node stores a data block corresponding to the position in the locality summaries. Determining which of the particular computing nodes provided a locality summary having a value set at the particular position includes identifying nonzero positions in the bit vector.

In some implementations, the controller computing node maintains a mapping between computing node identifiers and positions in the bit vector. The controller computing node maps the nonzero positions in the bit vector to respective computing node identifiers.

In some implementations, the controller computing node generates, for multiple locality summaries received over time from the plurality of computing nodes, a respective likelihood that each computing node of the plurality of computing nodes currently stores a particular data block. In some implementations, requesting, from each computing node of the particular computing nodes, data indicating whether or not the computing node locally stores the particular data block includes requesting the data from the computing nodes in an order determined by the respective likelihoods that that the particular computing nodes currently store the particular data block. The data blocks stored locally by the plurality of computing nodes comprises data in main memory, on local disk, or both. The locality summary is implemented as a Bloom filter.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments and the embodiments described above, the following embodiments are also innovative:

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
    storing locally in main memory of each computing node of a plurality of computing nodes, by each respective computing node of the plurality of computing nodes, respective data blocks, wherein each data block is a piece of data, wherein each data block is associated with a respective block identifier that is a unique identifier over all data blocks stored on all computing nodes, and each data block is one of a plurality of data blocks;
    determining, by each computing node of the plurality of computing nodes, one or more block identifiers of data blocks stored locally in main memory of the computing node;
    generating, by each computing node of the plurality of computing nodes, a respective locality summary having n positions and n corresponding values, wherein n is an integer less than a total number of the data blocks, wherein the respective locality summary represents which of the plurality of data blocks are stored locally by the computing node, and wherein generating the locality summary includes mapping each of the one or more block identifiers stored by the computing node to a respective position in the locality summary and setting a value at the respective position in the locality summary; and
    sending, by each computing node of the plurality of computing nodes to a controller computing node, the respective locality summary generated by the computing node.

2. The method of claim 1, wherein mapping each of the one or more block identifiers to the respective position in the locality summary comprises computing a position index identified by (i mod n), wherein i is a block identifier, i being an integer, and n is a size of the locality summary.

3. The method of claim 1, further comprising:
    periodically regenerating, by each computing node of the plurality of computing nodes, the locality summary for the computing node.

4. The method of claim 1, wherein the locality summary is implemented as a Bloom filter.

5. The method of claim 1, further comprising:
    receiving, by the controller computing node, a request to identify which computing node locally stores a particular data block identified by a particular block identifier;
    determining, by the controller computing node from the locality summaries sent to the controller computing node, which computing nodes are candidate computing nodes, candidate computing nodes being computing nodes that are not excluded by the locality summaries as nodes that are storing the particular block; and requesting, from each candidate computing node, data indicating whether or not the candidate computing node locally stores the particular data block.

6. A computer-implemented method comprising:
receiving, by a controller computing node, locality summaries from a plurality of computing nodes, wherein each locality summary identifies which of a plurality of data blocks are stored locally on a respective computing node by mapping each of one or more block identifiers identifying a respective locally stored data block to a respective position in the locality summary and setting a value at the respective position in the locality summary;
receiving, by the controller computing node, a request to identify which computing node locally stores a particular data block identified by a particular block identifier;
mapping the particular block identifier to a particular position in received locality summaries;
determining, by the controller computing node, which of the particular computing nodes provided a locality summary having a value set at the particular position; and
requesting, from each computing node of the particular computing nodes, data indicating whether or not the computing node locally stores the particular data block.

7. The method of claim 6, further comprising:
receiving, by the controller computing node, an indication that a first computing node of the particular computing nodes locally stores the particular data block; and
providing, by the controller computing node and to the first computing node, a request to perform a computation using the particular data block.

8. The method of claim 6, further comprising:
maintaining, by the controller computing node, a respective bit vector for each position in the locality summaries received from the plurality of computing nodes, wherein each position in the bit vector represents whether a particular node stores a data block corresponding to the position in the locality summaries,
wherein determining which of the particular computing nodes provided a locality summary having a value set at the particular position comprises identifying nonzero positions in the bit vector.

9. The method of claim 8, further comprising:
maintaining, by the controller computing node, a mapping between computing node identifiers and positions in the bit vector; and
mapping the nonzero positions in the bit vector to respective computing node identifiers.

10. The method of claim 6, further comprising:
generating, by the controller computing node and for a plurality of locality summaries received over time from the plurality of computing nodes, a respective likelihood that each computing node of the plurality of computing nodes currently stores a particular data block.

11. The method of claim 10, wherein requesting, from each computing node of the particular computing nodes, data indicating whether or not the computing node locally stores the particular data block comprises requesting the data from the computing nodes in an order determined by the respective likelihoods that that the particular computing nodes currently store the particular data block.

12. A system comprising:
one or more computers and one or more storage devices storing instructions that are operable, when executed by the one or more computers, to cause the one or more computers to perform operations comprising:
storing locally in main memory of each computing node of a plurality of computing nodes, by each respective computing node of the plurality of computing nodes, respective data blocks, wherein each data block is a piece of data, wherein each data block is associated with a respective block identifier that is a unique identifier over all data blocks stored on all computing nodes, and each data block is one of a plurality of data blocks;
determining, by each computing node of the plurality of computing nodes, one or more block identifiers of data blocks stored locally in main memory of the computing node;
generating, by each computing node of the plurality of computing nodes, a respective locality summary having n positions and n corresponding values, wherein n is an integer less than a total number of the data blocks, wherein the respective locality summary represents which of the plurality of data blocks are stored locally by the computing node, and wherein generating the locality summary includes mapping each of the one or more block identifiers stored by the computing node to a respective position in the locality summary and setting a value at the respective position in the locality summary; and
sending, by each computing node of the plurality of computing nodes to a controller computing node, the respective locality summary generated by the computing node.

13. The system of claim 12, wherein mapping each of the one or more block identifiers to the respective position in the locality summary comprises computing a position index identified by (i mod n), wherein i is a block identifier, i being an integer, and n is a size of the locality summary.

14. The system of claim 12, wherein the operations further comprise:
periodically regenerating, by each computing node of the plurality of computing nodes, the locality summary for the computing node.

15. The system of claim 12, wherein the locality summary is implemented as a Bloom filter.

16. The system of claim 12, wherein the system further comprises the controller computing node and wherein the controller computing node comprises one or more controller computers and one or more controller storage devices storing instructions that are operable, when executed by the one or more controller computers to perform operations comprising:
receiving, by the controller computing node, a request to identify which computing node locally stores a particular data block identified by a particular block identifier;
determining, by the controller computing node from the locality summaries sent to the controller computing node, which computing nodes are candidate computing nodes, candidate computing nodes being computing nodes that are not excluded by the locality summaries as nodes that are storing the particular block; and
requesting, from each candidate computing node, data indicating whether or not the candidate computing node locally stores the particular data block.

17. A system comprising:
one or more computers and one or more storage devices storing instructions that are operable, when executed by the one or more computers, to cause the one or more computers to perform operations comprising:

receiving, by a controller computing node, locality summaries from a plurality of computing nodes, wherein each locality summary identifies which of a plurality of data blocks are stored locally on a respective computing node by mapping each of one or more block identifiers identifying a respective locally stored data block to a respective position in the locality summary and setting a value at the respective position in the locality summary;

receiving, by the controller computing node, a request to identify which computing node locally stores a particular data block identified by a particular block identifier;

mapping, by the controller computing node, the particular block identifier to a particular position in received locality summaries;

determining, by the controller computing node, which of the particular computing nodes provided a locality summary having a value set at the particular position; and requesting, by the controller computing node and from each computing node of the particular computing nodes, data indicating whether or not the computing node locally stores the particular data block.

18. The system of claim 17, wherein the operations further comprise:

receiving, by the controller computing node, an indication that a first computing node of the particular computing nodes locally stores the particular data block; and providing, by the controller computing node and to the first computing node, a request to perform a computation using the particular data block.

19. The system of claim 17, wherein the operations further comprise:

maintaining, by the controller computing node, a respective bit vector for each position in the locality summaries received from the plurality of computing nodes, wherein each position in the bit vector represents whether a particular node stores a data block corresponding to the position in the locality summaries, wherein determining which of the particular computing nodes provided a locality summary having a value set at the particular position comprises identifying nonzero positions in the bit vector.

20. The system of claim 19, wherein the operations further comprise:

maintaining, by the controller computing node, a mapping between computing node identifiers and positions in the bit vector; and mapping the nonzero positions in the bit vector to respective computing node identifiers.

21. The system of claim 17, wherein the operations further comprise:

generating, by the computing node and for a plurality of locality summaries received over time from the plurality of computing nodes, a respective likelihood that each computing node of the plurality of computing nodes currently stores a particular data block.

22. The system of claim 21, wherein requesting, by the computing node and from each computing node of the particular computing nodes, data indicating whether or not the computing node locally stores the particular data block comprises requesting the data from the computing nodes in an order determined by the respective likelihoods that that the particular computing nodes currently store the particular data block.

23. A computer program product, encoded on one or more non-transitory computer storage media, comprising instructions that when executed by one or more computers cause the one or more computers to perform operations comprising:

storing locally in main memory of each computing node of a plurality of computing nodes, by each respective computing node of the plurality of computing nodes, respective data blocks, wherein each data block is a piece of data, wherein each data block is associated with a respective block identifier that is a unique identifier over all data blocks stored on all computing nodes, and each data block is one of a plurality of data blocks determining, by each computing node of the plurality of computing nodes, one or more block identifiers of data blocks stored locally in main memory of the computing node;

generating, by each computing node of the plurality of computing nodes, a respective locality summary having n positions and n corresponding values, wherein n is an integer less than a total number of the data blocks, wherein the respective locality summary represents which of the plurality of data blocks are stored locally by the computing node, and wherein generating the locality summary includes mapping each of the one or more block identifiers stored by the computing node to a respective position in the locality summary and setting a value at the respective position in the locality summary; and sending, by each computing node of the plurality of computing nodes to a controller computing node, the respective locality summary generated by the computing node.

24. The computer program product of claim 23, wherein mapping each of the one or more block identifiers to the respective position in the locality summary comprises computing a position index identified by (i mod n), wherein i is a block identifier, i being an integer, and n is a size of the locality summary.

25. The computer program product of claim 23, wherein the operations further comprise:

periodically regenerating, by each computing node of the plurality of computing nodes, the locality summary for the computing node.

26. The computer program product of claim 23, wherein the locality summary is implemented as a Bloom filter.

27. The computer program product of claim 23, wherein the operations further comprise:

receiving, by the controller computing node, a request to identify which computing node locally stores a particular data block identified by a particular block identifier;

determining, by the controller computing node from the locality summaries sent to the controller computing node, which computing nodes are candidate computing nodes, candidate computing nodes being computing nodes that are not excluded by the locality summaries as nodes that are storing the particular block; and requesting, from each candidate computing node, data indicating whether or not the candidate computing node locally stores the particular data block.

28. A computer program product, encoded on one or more non-transitory computer storage media, comprising instructions that when executed by one or more computers cause the one or more computers to perform operations comprising:

receiving, by a controller computing node, locality summaries from a plurality of computing nodes, wherein each locality summary identifies which of a plurality of data blocks are stored locally on a respective computing node by mapping each of one or more block identifiers identifying a respective locally stored data block to a respective position in the locality summary and setting a value at the respective position in the locality summary;

receiving, by the controller computing node, a request to identify which computing node locally stores a particular data block identified by a particular block identifier;

mapping the particular block identifier to a particular position in received locality summaries;

determining, by the controller computing node, which of the particular computing nodes provided a locality summary having a value set at the particular position; and requesting, from each computing node of the particular computing nodes, data indicating whether or not the computing node locally stores the particular data block.

29. The computer program product of claim 28, wherein the operations further comprise:

receiving, by the controller computing node, an indication that a first computing node of the particular computing nodes locally stores the particular data block; and providing, by the controller computing node and to the first computing node, a request to perform a computation using the particular data block.

30. The computer program product of claim 28, wherein the operations further comprise:

maintaining, by the controller computing node, a respective bit vector for each position in the locality summaries received from the plurality of computing nodes, wherein each position in the bit vector represents whether a particular node stores a data block corresponding to the position in the locality summaries, wherein determining which of the particular computing nodes provided a locality summary having a value set at the particular position comprises identifying nonzero positions in the bit vector.

31. The computer program product of claim 30, wherein the operations further comprise:

maintaining, by the controller computing node, a mapping between computing node identifiers and positions in the bit vector; and mapping, by the controller computing node, the nonzero positions in the bit vector to respective computing node identifiers.

32. The computer program product of claim 28, wherein the operations further comprise:

generating, by the controller computing node and for a plurality of locality summaries received over time from the plurality of computing nodes, a respective likelihood that each computing node of the plurality of computing nodes currently stores a particular data block.

33. The computer program product of claim 32, wherein requesting, by the controller computing node and from each computing node of the particular computing nodes, data indicating whether or not the computing node locally stores the particular data block comprises requesting the data from the computing nodes in an order determined by the respective likelihoods that that the particular computing nodes currently store the particular data block.

* * * * *

UNITED STATES PATENT AND TRADEMARK OFFICE
CERTIFICATE OF CORRECTION

PATENT NO. : 10,310,748 B2
APPLICATION NO. : 15/249138
DATED : June 4, 2019
INVENTOR(S) : Harshad Deshmukh et al.

Page 1 of 1

It is certified that error appears in the above-identified patent and that said Letters Patent is hereby corrected as shown below:

In the Claims

Column 9, Line 63, in Claim 11: delete "that that" and insert --that--, therefor;

Column 11, Line 63, in Claim 22: delete "that that" and insert --that--, therefor; and Column 14, Line 30, in Claim 33: delete "that that" and insert --that--, therefor.

Signed and Sealed this
Sixth Day of August, 2019

Andrei Iancu
*Director of the United States Patent and Trademark Office*